United States Patent
Shah et al.

(10) Patent No.: US 12,444,942 B2
(45) Date of Patent: Oct. 14, 2025

(54) SYSTEMS AND METHODS FOR REDUCING CARBON EMISSIONS FROM MACHINE LEARNING COMPUTATIONAL TASKS

(71) Applicant: General Electric Company, Schenectady, NY (US)

(72) Inventors: Tapan Ravin Shah, Los Altos, CA (US); Scott Charles Evans, Burnt Hills, NY (US); Arunvenkataraman Subramanian, Dublin, CA (US); Jeffrey Thomas Maskalunas, Schenectady, NY (US); Sachini Piyoni Ekanayake Ekanayake Mudiyanselage, Troy, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 457 days.

(21) Appl. No.: 18/159,543

(22) Filed: Jan. 25, 2023

(65) Prior Publication Data
US 2024/0250530 A1  Jul. 25, 2024

(51) Int. Cl.
  *H02J 3/00* (2006.01)
  *H02J 3/14* (2006.01)
(52) U.S. Cl.
  CPC .............. *H02J 3/004* (2020.01); *H02J 3/144* (2020.01); *H02J 2300/20* (2020.01)
(58) Field of Classification Search
  CPC ......... H02J 3/004; H02J 3/144; H02J 2300/20
  (Continued)

(56) References Cited

U.S. PATENT DOCUMENTS 11,398,000 B2  7/2022  Shi
2021/0123771 A1  4/2021  Vega et al.
  (Continued)

FOREIGN PATENT DOCUMENTS

WO  2022023455 A1  2/2022

OTHER PUBLICATIONS

S. A. Budennyy et al., 'eco2AI: Carbon Emissions Tracking of Machine Learning Models as theFirst Step Towards Sustainable AI', Advanced Studies in Artificial Intelligence Andmachine Learning, vol. 106, pp. 118-128, Jan. 19, 2023 pp. 118-127.
  (Continued)

*Primary Examiner* — Jigneshkumar C Patel
(74) *Attorney, Agent, or Firm* — Armstrong Teasdale LLP

(57) ABSTRACT

A computer system is provided. The computer system includes a scheduling computing device configured to receive computational task data defining a computational task to be performed, retrieve site data corresponding to each of a plurality of data processing computing devices, select, based on the computational task data and the site data, i) a first computational algorithm for executing the computational task, ii) a first data processing computing device of the plurality of data processing computing devices, and iii) at least one time period for executing the first computational algorithm by the first data processing computing device, wherein the first computational algorithm, the first data processing computing device, and the at least one time period are selected to facilitate reducing carbon dioxide emissions associated with executing the computational algorithm, and instruct the first data processing computing device to execute the first computational algorithm during the at least one time period.

20 Claims, 6 Drawing Sheets

(58) Field of Classification Search
USPC .......................................................... 700/291
See application file for complete search history.

(56) References Cited

U.S. PATENT DOCUMENTS

| | | |
|---|---|---|
| 2021/0373973 A1 | 12/2021 | Ekins et al. |
| 2022/0104403 A1 | 3/2022 | Heydari |
| 2022/0261685 A1 | 8/2022 | Sabat et al. |
| 2024/0143702 A1* | 5/2024 | Bahrami ............... G06F 18/211 |
| 2024/0242104 A1* | 7/2024 | Abhyankar ........... G06F 40/166 |

OTHER PUBLICATIONS

Jesse Dodge et al., 'Measuring the Carbon Intensity of AI in Cloud Instances', FAccT '22: Proceedings of the 2022 ACM Conference on Fairness, Accountability, and Transparency, pp. 1877-1894, Jun. 20, 2022 pp. 1877-1887.

International Search Report received for PCT/US2024/012483 on May 21, 2024; 6 pps.

Selvan et al., Carbon Footprint of Selecting and Training Deep Learning Models for Medical Image Analysis, Mar. 4, 2022, 13 pages.

De Chateauvieux et al., Optimize AI/ML workloads for sustainability: Part 2, model development, Architecture, Artificial Intelligence, AWS Well-Architected, Sustainability, Mar. 21, 2022, 5 pages.

Lacoste et al., Quantifying the Carbon Emissions of Machine Learning, Nov. 4, 2019, 8 pages.

Dutta, AI for Environmental Sustainability, Analytics Steps Infomedia LLP, Jan. 5, 2022, 6 pages.

* cited by examiner

SYSTEMS AND METHODS FOR REDUCING CARBON EMISSIONS FROM MACHINE LEARNING COMPUTATIONAL TASKS

BACKGROUND

The field of the invention relates generally to computer systems that perform computational learning tasks, such as machine learning (ML), artificial intelligence (AI), computational fluid dynamics simulations, and other computation and learning tasks, and more particularly, to systems and methods for reducing carbon dioxide emissions resulting from execution of computational learning tasks.

Computational learning tasks such as ML and AI are ubiquitous in many applications. However, increases in, for example training data size and model size have required increases in computational resources required to train a ML model. ML is an energy intensive computational task, and because computing resources are often powered by carbon dioxide-emitting sources, executing an ML tasks may result in large amounts (e.g., over 500 metric tons) of carbon dioxide emissions and/or other undesirable emissions. Accordingly, a system capable of reducing carbon dioxide emissions associated with performing ML tasks while maintaining desired performance characteristics (e.g., accuracy) of the ML model is desirable.

BRIEF DESCRIPTION

In one aspect, a computer system is provided. The computer system includes a plurality of data processing computing devices. Each of the plurality of data processing computing devices is configured to execute one or more computational algorithms. The computer system further includes a scheduling computing device including a memory and a processor in communication with the memory and the plurality of data processing computing devices. The processor is configured to receive computational task data defining a computational task to be performed. The processor is further configured to retrieve site data corresponding to each of the plurality of data processing computing devices. The site data specifies an expected carbon dioxide emission associated with use of each of the plurality of data processing computing devices. The processor is further configured to select, based on the computational task data and the site data, i) a first computational algorithm for executing the computational task, ii) a first data processing computing device of the plurality of data processing computing devices, and iii) at least one time period for executing the first computational algorithm by the first data processing computing device, wherein the first computational algorithm, the first data processing computing device, and the at least one time period are selected to facilitate reducing carbon dioxide emissions associated with executing the computational algorithm. The processor is further configured to instruct the first data processing computing device to execute the first computational algorithm during the at least one time period.

In another aspect, a method is provided. The method is performed by a scheduling computing device including a memory and a processor in communication with the memory and with a plurality of data processing computing devices. Each of the data processing computing devices is configured to execute one or more computational algorithms. The method includes receiving, by the scheduling computing device, computational task data defining a computational task to be performed. The method further includes retrieving, by the scheduling computing device, site data corresponding to each of the plurality of data processing computing devices. The site data specifies an expected carbon dioxide emission associated with use of each of the plurality of data processing computing devices. The method further includes selecting, by the scheduling computing device, based on the computational task data and the site data, i) a first computational algorithm for executing the computational task, ii) a first data processing computing device of the plurality of data processing computing devices, and iii) at least one time period for executing the first computational algorithm by the first data processing computing device, wherein the first computational algorithm, the first data processing computing device, and the at least one time period are selected to facilitate reducing carbon dioxide emissions associated with executing the computational algorithm. The method further includes instructing, by the scheduling computing device, the first data processing computing device to execute the first computational algorithm during the at least one time period.

In another aspect, a scheduling computing device is provided. The scheduling computing device includes a memory and a processor in communication with the memory and a plurality of data processing computing devices. Each of the plurality of data processing computing devices is configured to execute one or more computational algorithms. The processor is configured to receive computational task data defining a computational task to be performed. The processor is further configured to retrieve site data corresponding to each of the plurality of data processing computing devices. The site data specifies an expected carbon dioxide emission associated with use of each of the plurality of data processing computing devices. The processor is further configured to select, based on the computational task data and the site data, i) a first computational algorithm for executing the computational task, ii) a first data processing computing device of the plurality of data processing computing devices, and iii) at least one time period for executing the first computational algorithm by the first data processing computing device, wherein the first computational algorithm, the first data processing computing device, and the at least one time period are selected to facilitate reducing carbon dioxide emissions associated with executing the computational algorithm. The processor is further configured to instruct the first data processing computing device to execute the first computational algorithm during the at least one time period.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
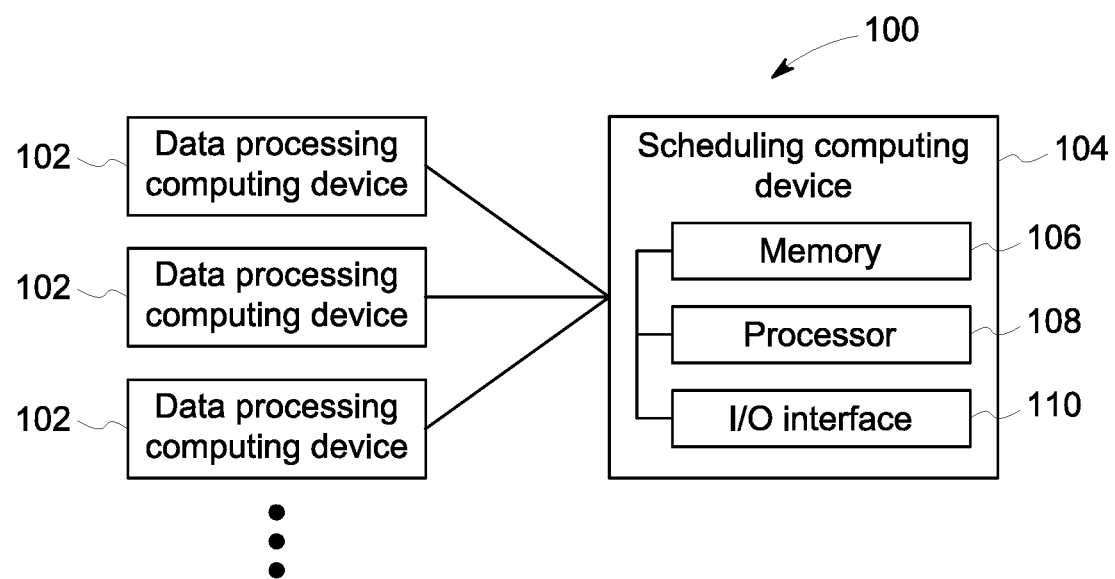
FIG. 1 is a block diagram of an example computer system for executing ML tasks.

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

In example embodiments, a computer system for scheduling and executing ML tasks includes a plurality of data processing computing devices, each of which are configured to execute one or more machine learning (ML) algorithms. The data processing computing devices may be located at a plurality of different sites, with each of the sites receiving power from some combination of renewable and non-renewable (e.g., carbon-emitting) power sources. The percentage of power received from renewable or non-carbon-emitting sources may fluctuate or vary over time.

The computer system further includes a scheduling computing device including a memory and a processor that is in communication with the memory and with the plurality of data processing computing devices. The processor is configured to receive ML task data defining an ML task to be performed, and to retrieve site data corresponding to each of the plurality of data processing computing devices. The task data may include training data used to train a ML model, the specific task (regression, classification, clustering) to be executed, and/or a list of required ML model specifications. The site data specifies an expected carbon dioxide emission associated with use of each of the plurality of data processing computing devices at given times.

The scheduling computing device is further configured to select, based on the ML task data and the site data, i) a ML algorithm for executing the ML task, ii) a data processing computing device or location for performing the ML task, and iii) at least one time period for executing the first ML algorithm by the selected data processing computing device. The ML algorithm, data processing computing device, and time period are selected to reduce carbon dioxide emissions associated with executing the ML algorithm. For example, the ML algorithm, and a number of iterations for performing the ML algorithm, may be selected to maximize an accuracy of the ML model being generated per unit energy used or carbon dioxide emissions produced. The location and time period for executing the ML algorithm may be selected to maximize a percentage of power that is renewably sourced during execution of the ML algorithm, thereby reducing the resulting carbon dioxide emissions.

FIG. 1 is a block diagram illustrating an example computer system 100. Computer system 100 includes a plurality of data processing computing devices 102, each of which may be configured to execute one or more ML algorithms. Computer system further includes a scheduling computing device 104, which includes a memory 106, a processor 108, and an input/output (I/O) interface 110. I/O interface 110 is configured to enable scheduling computing device 104 to communicate with data processing computing devices via, for example, a local and/or cloud computing network. In some embodiments, I/O interface 110 further enables data to be input and/or output to scheduling computing device through, for example, a local user interface and/or via another computing device in communication with scheduling computing device 104.

Data processing computing devices 102 are disposed at a plurality of different locations or sites. In some embodiments, data processing computing devices may be associated with or form part of data centers or other similar systems. Each location or site may receive power from some combination of renewable or non-renewable sources. The combination for each site may fluctuate over time. For example, the amount of renewable or non-renewable power available at a particular site may depend on a time of day, weather (e.g., for solar and/or wind sources), and other factors that change over time.

Scheduling computing device 104 is configured to store data referred to herein as "site data," descriptive of data processing computing devices 102 and their respective sites. The site data may include information regarding data processing computing devices 102 such as, for example, hardware processing and storage capabilities. The site data may further include information that enables scheduling computing device 104 to predict, for a given time period, which types of power sources (e.g., renewable or non-renewable) are available to provide power to data processing computing device 102. Accordingly, as described in further detail below, scheduling computing device 104 can predict, for a given computing or ML task, an amount of energy a data processing computing device 102 needs to complete the ML task, and in cases where at least some of the energy is supplied by non-renewable sources, carbon dioxide emissions associated with completing the ML task. The site data may be updated (e.g., periodically or continuously) based on various input sources such as, for example, data processing computing devices 102, other computing devices associated with computer system 100, and/or external data sources such as the Internet.

Scheduling computing device 104 is configured to receive task data relating to or defining a ML task to be executed by computer system 100. The task data may include, for example, input and output data types, input data sets, a desired or required accuracy for the ML model, deadlines for completing the ML task, and/or other parameters or requirements relating to the ML task. In some embodiments, the task data further includes quality specifications (e.g., expected accuracy), datasets (e.g., including size, preprocessing, and/or feature selection), expected energy requirement, and/or expected computational time. In some embodiments, the task data further defines a priority for the ML task (e.g., HIGH, MEDIUM, and/or LOW), based on which the ML task may be prioritized with respect to other ML tasks during scheduling.

Based on the task data, scheduling computing device 104 is configured to select a ML algorithm for performing the ML task. Some examples of ML algorithms that may be performed include Bidirectional Encoder Representation from Transformers (BERT), Generative Pre-trained Transformer 2 (GPT-2), Generative Pre-trained Transformer 3 (GPT-3), Elmo, Meena, transformers, and/or other models. In some embodiments, additional algorithm specifications and/or quantifying parameters, such as hyperparameters (e.g., learning rate) and/or structural parameters (e.g., number of hidden layers) are determined. In some embodiments, scheduling computing device 104 is further configured to determine a number of iterations of the selected ML algorithm that need to be run in order to achieve a desired accuracy or perform optimally. To select the ML algorithm, scheduling computing device 104 is configured to compute an estimated energy requirement for each of a group of candidate ML algorithms, taking into account the number of iterations each candidate ML algorithm needs to be run. Scheduling computing device 104 is configured to select a ML algorithm from among the candidate ML algorithms based on the estimated energy requirement. For example, scheduling computing device 104 may select an ML algorithm that requires the least energy, or that provides the most accuracy per unit energy and/or unit of carbon dioxide emissions. As described in further detail below, in some embodiments, the ML algorithm is selected in conjunction with the location and time at which the ML algorithm is to be executed to optimize, for example, energy use and/or carbon dioxide emissions.

Model accuracy can be measured through many means, including loss functions, such as mean squared error or mean absolute error, that are generalizable on validation data sets (not part of training), or classification error rates for classification problems. Accuracy of unsupervised learning problems such as clustering can be determined through metrics such as Jensen Shannan distance or other means of determining the repeatability of learned solutions on draws of data from the source distribution.

Scheduling computing device 104 is further configured to select a data processing computing device 102 for executing the ML task. The particular data processing computing device 102 may be selected based on one or more the ML task data, the selected ML algorithm, site data relating to the data processing computing device 102, a predicted energy use associated with executing the selected ML algorithm on the data processing computing device 102, and/or an expected carbon dioxide emission associated with executing the selected ML algorithm. For example, in some embodiments, scheduling computing device 104 computes an energy requirement and/or carbon dioxide emission for executing the ML algorithm at each of a group of candidate data processing computing devices 102, and selects a data processing computing device 102 from among a group of candidate data processing computing devices 102 based on the predicted energy requirement and/or carbon dioxide emission for each candidate data processing computing device 102. For example, scheduling computing device 104 may select an ML algorithm that requires the least energy and/or will produce the least carbon dioxide emissions. As described in further detail below, in some embodiments, the data processing computing device 102 used to execute the ML algorithm is selected in conjunction with the ML algorithm and time at which the ML algorithm is to be executed to optimize, for example, energy use and/or carbon dioxide emissions.

Scheduling computing device 104 is further configured to select at least one time period for executing the ML task. In some embodiments, the ML task may be executed by multiple data processing computing devices 102 in parallel or serially during consecutive or non-consecutive time periods. To determine when to execute the ML task, scheduling computing device 104 considers the availability of renewable power over time. For example, scheduling computing device 104 may select a time period when more renewable power is expected to be available (e.g., based on time of day, weather conditions, or other factors) in order to reduce the amount of non-renewable power used and carbon dioxide emissions produced. Scheduling computing device 104 further considers the availability of each data processing computing device 102 based on already-scheduled tasks, and may reschedule tasks in order to optimize for energy use and/or carbon dioxide emissions. As described in further detail below, in some embodiments, the time period for executing the ML algorithm is selected in conjunction with the ML algorithm and the data processing computing device 102 at which the ML algorithm is to be executed to optimize, for example, energy use and/or carbon dioxide emissions.

To select, for example, the ML algorithm, the number of iterations for performing the ML algorithm, the data processing computing device 102 for executing the ML algorithm, and/or the time period for executing the ML algorithm, scheduling computing device 104 is configured to execute a constrained optimization problem that, for example, maximizes an accuracy of the ML algorithm per unit energy expected to be used and/or unit of carbon dioxide emissions expected to be produced. Constraints for the optimization problem may include factors such as, for example, computing capabilities of data processing computing devices 102, expected availability of renewable power, and/or a current utilization of data processing computing devices 102 (e.g., to perform other ML tasks). Further constraints may be applied for a given task such as, for example, a required accuracy for the ML model, a deadline for completing the ML task, the ML task needing to be performed by only one data processing computing device 102 and/or site or by one or more specifically designated data processing computing devices 102 and/or sites, the ML task needing to be performed during a preset time period and/or during a single contiguous time period, a maximum amount of energy or carbon dioxide emissions, whether or not the ML task may be executed in parallel by multiple data processing computing devices 102, and/or other constraints.

Scheduling computing device 104 is further configured to generate a schedule associated with the ML task. The schedule includes the selected algorithm, the selected data processing computing device 102, and the selected at least one time period for executing the ML algorithm. In some embodiments, the ML algorithm may be performed in parts at more than one site and/or during separate or non-consecutive time periods. Scheduling computing device 104 is configured to instruct the selected data processing computing device to execute the selected ML algorithm according to the schedule. In some embodiments, the scheduling computing device 104 may modify the schedule based on subsequent inputs of additional ML tasks, for example, in order to optimize each of the tasks for reducing energy use and/or carbon dioxide emissions. In some embodiments, the ML task may be further scheduled to reduce or minimize a starting delay for and/or based on an assigned priority (e.g., HIGH, MEDIUM, or LOW) associated with the ML task.

In some embodiments, scheduling computing device 104 may be configured to preprocess input data, or cause data processing computing devices 102 to preprocess input data, of the ML model to reduce the quantization bits of input data. By performing this preprocessing, the energy required for executing the ML algorithm to create the ML model may be reduced without significantly impacting the quality or accuracy of the ML model output. For example, in some implementations, input data can be preprocessed to lower quantization levels, discarding unnecessary and in some cases invalid claims of precision. Scaling and dimensionality reduction through methods such as principal component analysis (PCA) can be used to effectively preprocess the data to improve performance and reduce energy cost of learning.

In some embodiments, in certain sites (e.g., corresponding to certain data processing computing devices 102), heat from data center cooling processes is used to provide power for the associated data processing computing devices 102 (e.g., by being fed into a combined cycle gas/steam power plant). In such embodiments, scheduling computing device 104 may factor in this capability when selecting a data processing computing device 102 for performing a ML task.

In some embodiments, scheduling computing device 104 is further configured to consider power grid stability when selecting data processing computing devices 102 for completing each ML task, in order to distribute the execution of the ML tasks throughout computer system 100 in a manner that promotes stability in the power grid. In such embodiments, scheduling computing device 104 may further receive and store information relating to the power grid for determining which data processing computing devices 102 to use for completing ML tasks while supporting grid stability.

Figure 2A:
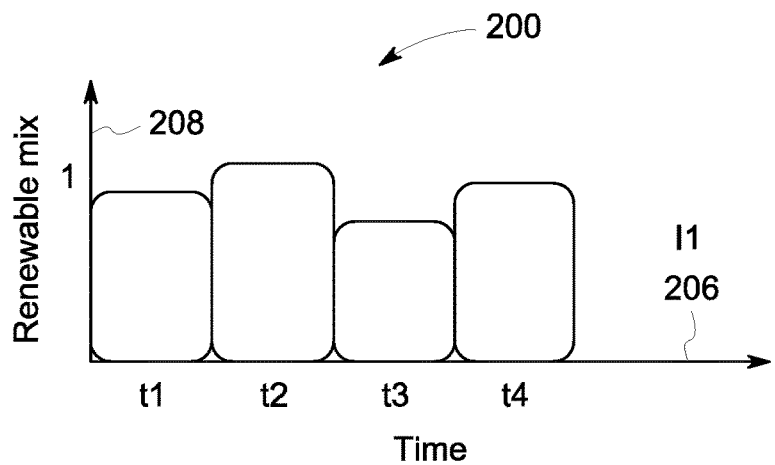
FIG. 2A is a graph illustrating an example renewable mix for a site over time.
Figure 2B:
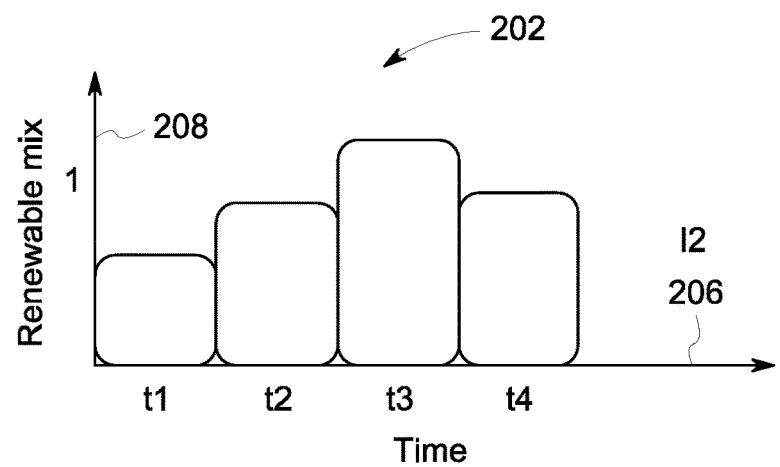
FIG. 2B is graph illustrating another example renewable mix for a site over time.
Figure 2C:
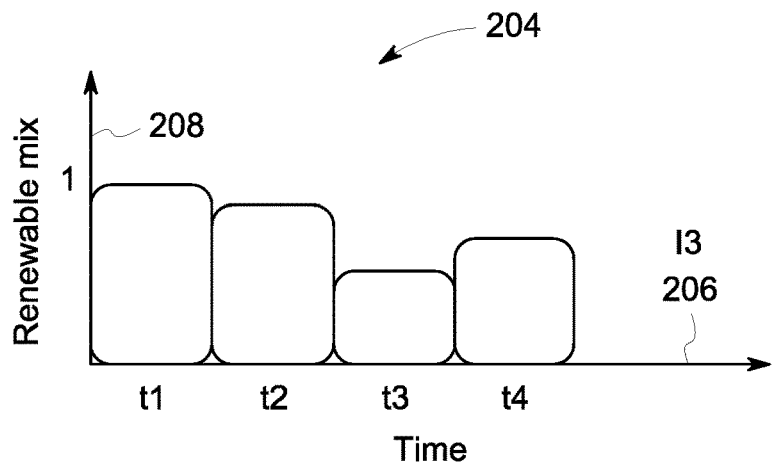
FIG. 2C is graph illustrating another example renewable mix for a site over time.

FIGS. 2A, 2B, and 2C depict a first graph 200, a second graph 202, and a third graph 204, respectively. Graphs 200, 202, and 204 each represent an example "renewable mix" or percentage of available power that is renewably sourced, for a respective site. Graphs 200, 202, and 204 each include a horizontal axis 206 that represents four discrete time periods $t_1$, $t_2$, $t_3$, and $t_4$, which may correspond to, for example, portions of a day or other period. Graphs 200, 202, and 204 further include a vertical access corresponding to the renewable mix, or a dimensionless ratio of an amount of renewable power to a total amount of power to be used at a respective site (e.g., by a respective data processing computing device 102). As shown in graphs 200, 202, and 204, the renewable mix for a given site may vary over time. This may be due to factors such as an availability of renewable (e.g., solar and/or wind) power, other power demands on the system, and/or other such factors. As described above with respect to FIG. 1, scheduling computing device 104 is configured to factor the expected renewable mix when selecting a site and time for executing an ML task.

Figure 3:
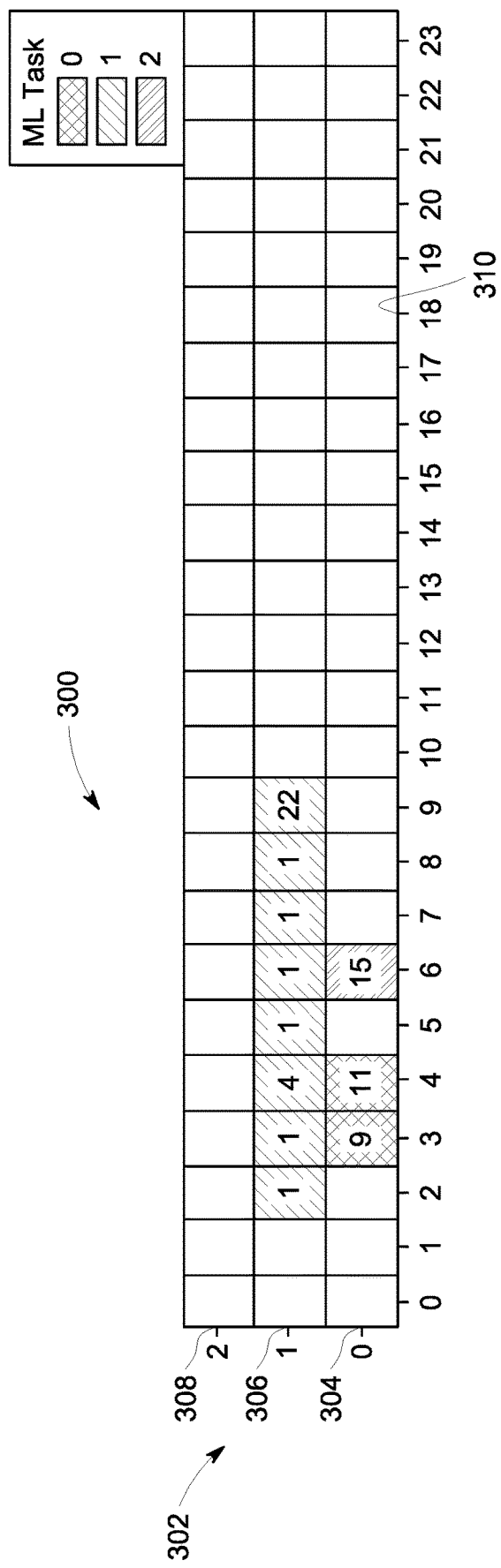
FIG. 3 is a chart illustrating an example schedule for an allocation of ML tasks.

FIG. 3 is a chart 300 illustrating an example schedule for an allocation of ML tasks among different data processing computing devices 102 over time that may be determined by scheduling computing device 104. Chart 300 includes a vertical axis 302 representing three data processing computing devices 102, including a first data processing computing device 304, a second data processing computing device, 306, and a third data processing computing device 308. Chart 300 further includes a horizontal axis 310 representing 24 discrete time periods (e.g., hours of a day) during which portions of an ML task may be performed.

Consider an example scenario illustrated by Table 1, which includes certain task data associated with three ML tasks (ML task 0, ML task 1, and ML task 2).

TABLE 1

| ML Task | 0 | 1 | 2 |
|---|---|---|---|
| Expected Energy Requirement | 20 | 32 | 15 |
| Arrival Time | 2 | 2 | 3 |
| Computation Time | 2 | 8 | 1 |
| Start Time Margin | 2 | 4 | 6 |

For each ML task, an expected energy requirement indicates the expected energy needed to execute the ML task, an arrival time represents time period the ML task is received, the computation time represents an expected amount of time needed for completing computation of the ML task, and a start time margin represents an indicator for starting time priority (e.g., the ML task must be started within two, four, or six hours). Based on this task data, scheduling computing device may schedule ML task 0, ML task 1, and ML task 2 among first data processing computing device 304, second data processing computing device, 306, and third data processing computing device 308 as shown in chart 300. As described above, scheduling computing device 104 is configured to schedule the ML tasks to increase or maximize a figure of merit (e.g., accuracy per unit energy and/or accuracy per unit carbon dioxide emission) that is attainable based on the constraints of the task data.

Figure 4A:
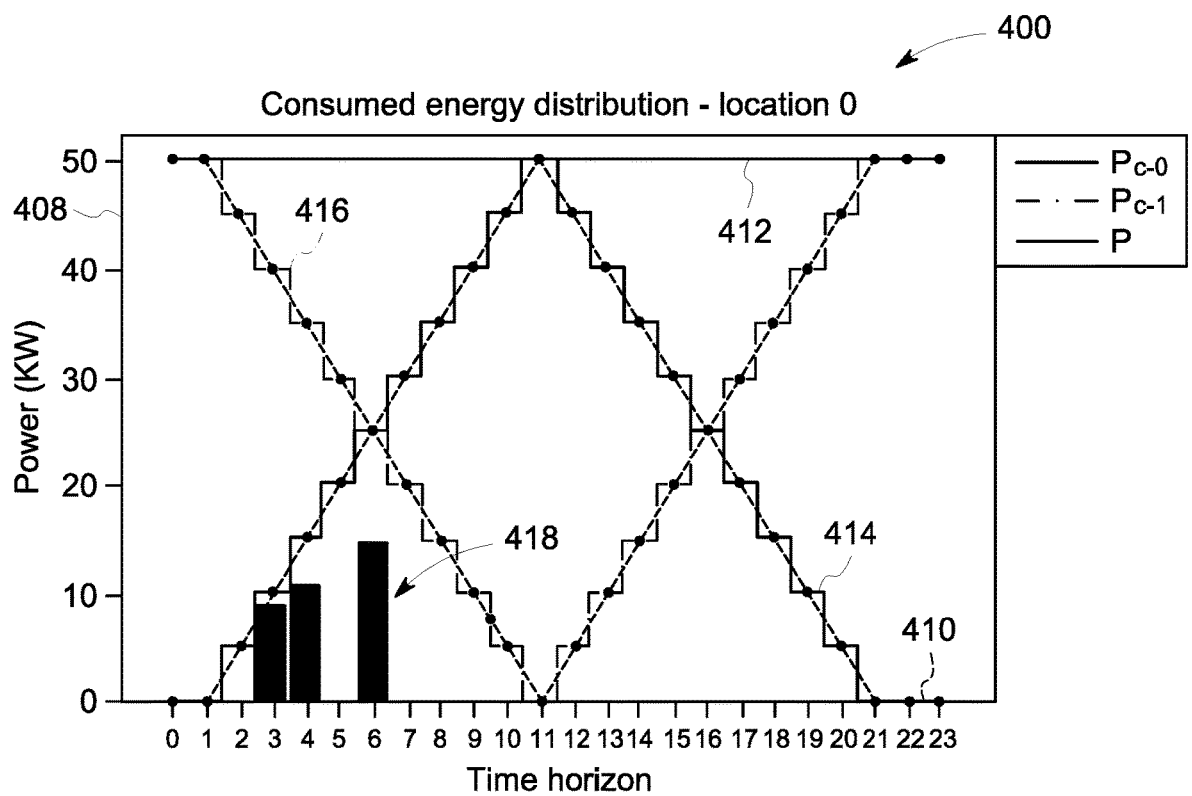
FIG. 4A is a graph illustrating an example available power for a site over time.
Figure 4B:
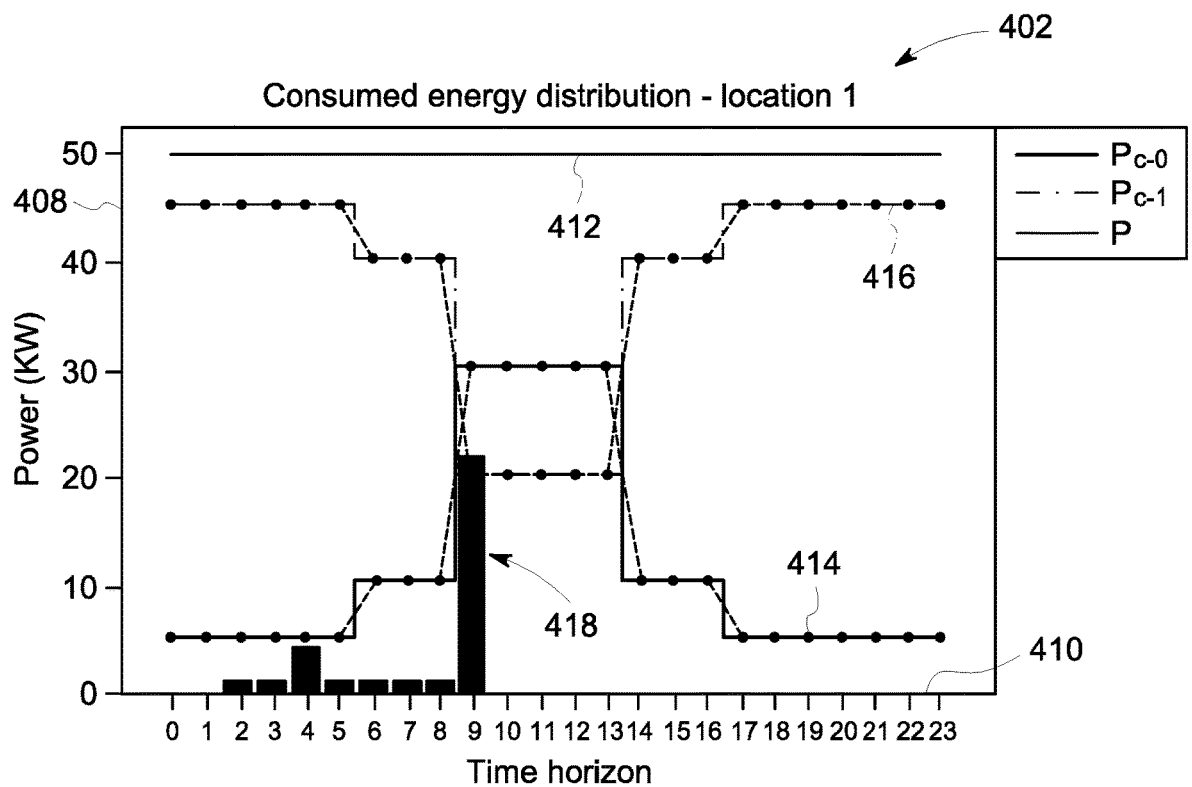
FIG. 4B is graph illustrating another example available power for a site over time.
Figure 4C:
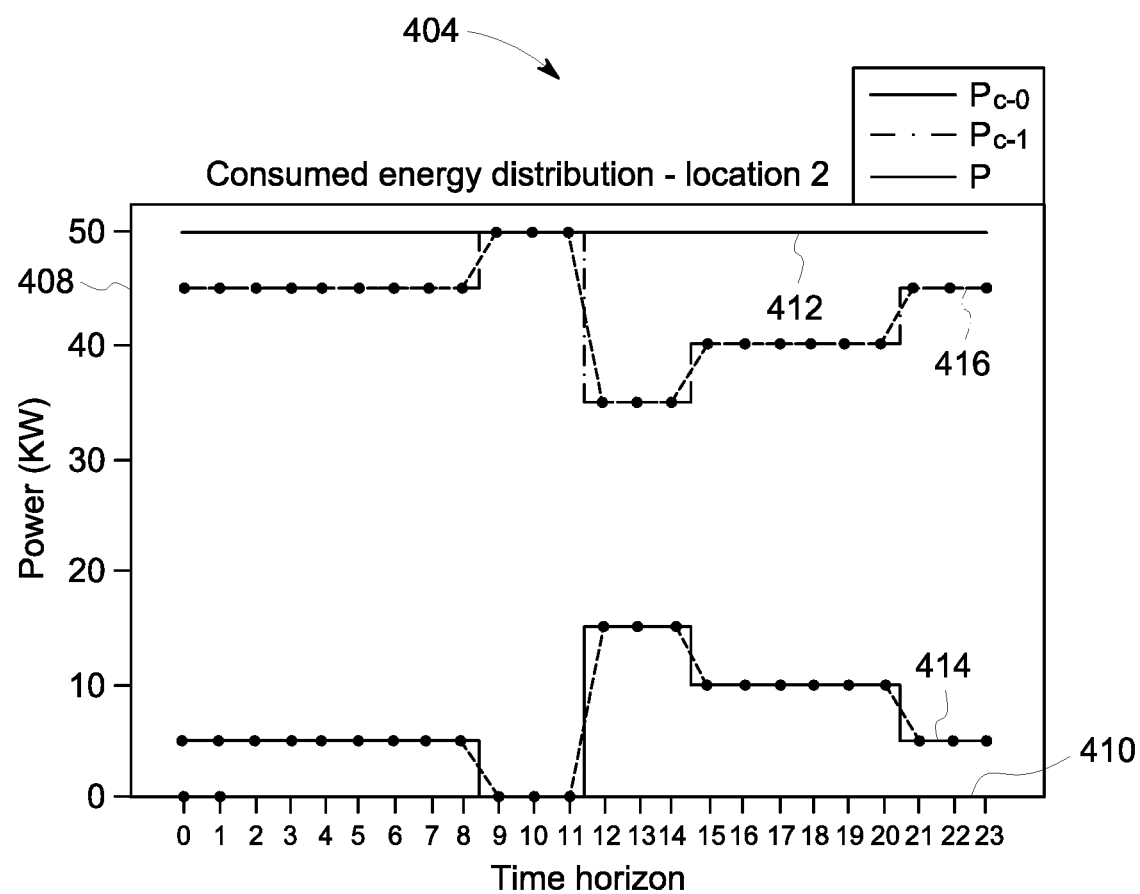
FIG. 4C is graph illustrating another example available power for a site over time.

FIGS. 4A, 4B, and 4C depict a first graph 400, a second graph 402, and a third graph 404, respectively. First graph 400 represents energy availability and use over time for first data processing computing device 304, second graph 402 represents energy availability and use over time for second data processing computing device 306, and third graph 404 represents energy availability and use over time for third data processing computing device 308. Each of first graph 400, second graph 402, and third graph 404 includes a vertical axis 408 representing power expressed in kilowatts (KW). Each of first graph 400, second graph 402, and third graph 404 further includes a horizontal axis 410 representing 24 discrete time periods corresponding to those represented by horizontal axis 310 of chart 300 shown in FIG. 3.

Each of first graph 400, second graph 402, and third graph 404 further includes a total available power curve 412, an available non-carbon dioxide emitting power curve 414, and an available carbon-dioxide emitting power curve 416. Total available power curve 412 represents the total available power for a given data processing computing device 102 for a period of time, available non-carbon dioxide emitting power curve 414 represents power available from non-carbon dioxide emitting resources for the period of time, and available carbon-dioxide emitting power curve 416 represents power available from carbon dioxide emitting resources for the period of time. Accordingly, the values represented by total available power curve 412 are a sum of those represented by available non-carbon dioxide emitting power curve 414, and available carbon-dioxide emitting power curve 416.

As shown in graphs 400 and 402, when executed according to the schedule illustrated in chart 300, a power consumed 418 during each time period for each data processing computing device 102 is less than the available carbon-dioxide emitting power represented by available carbon-dioxide emitting power curve 416. Accordingly, in this scenario, it is possible to execute ML task 0, ML task 1, and ML task 2 without emitting carbon dioxide.

Figure 5:
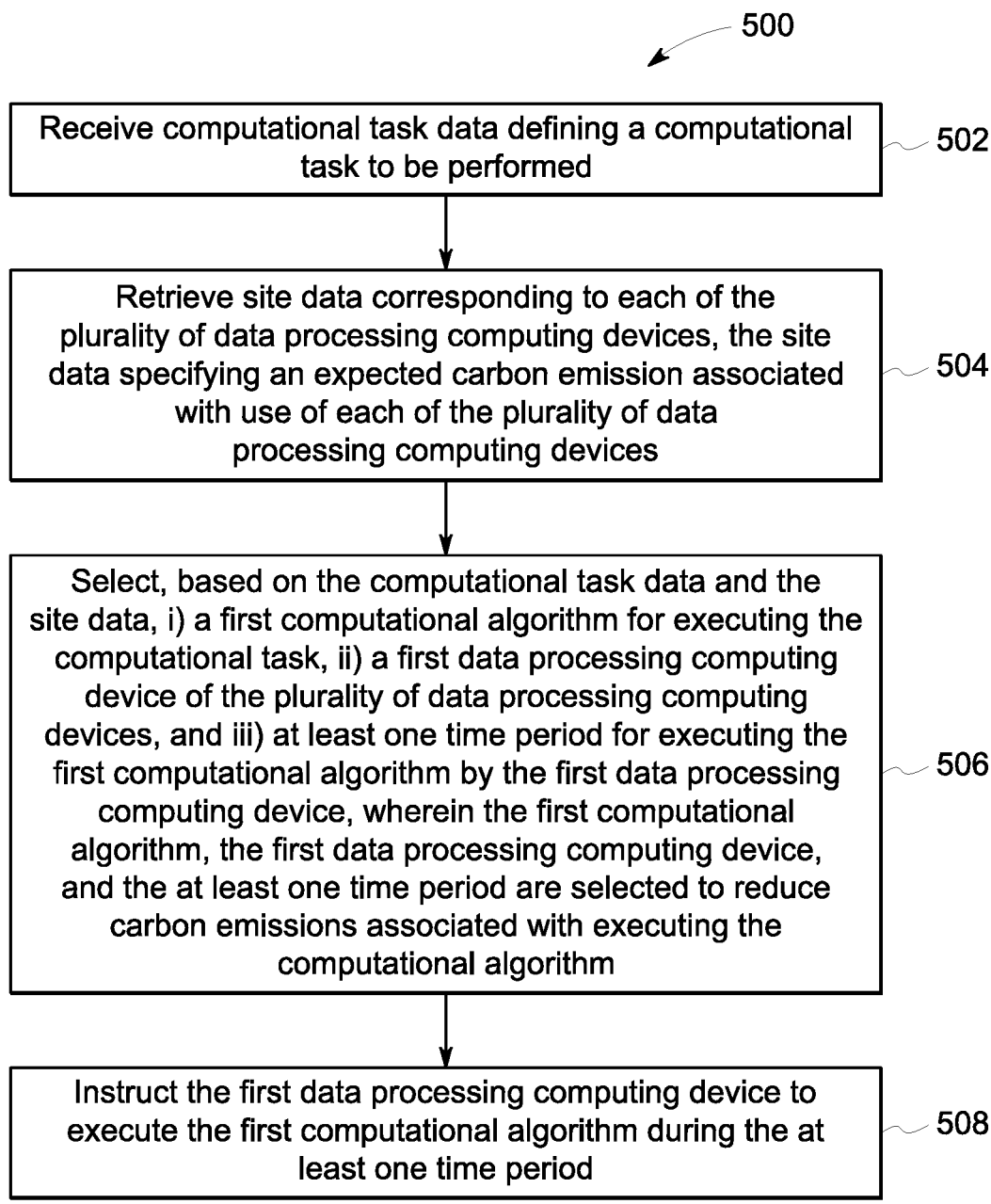
FIG. 5 is a flowchart of an example method of scheduling an executing a ML task.

FIG. 5 is a flowchart illustrating an example method 500 for scheduling an executing a ML task using a computer system such as computer system 100 (shown in FIG. 1). The computer system includes a plurality of data processing computing devices (such as data processing computing devices 102), each configured to execute one or more computational algorithms (e.g., ML and/or AI algorithms). The computer system further includes a scheduling computing device (such as scheduling computing device 104) including a memory (such as memory 106) and a processor (such as processor 108) in communication with the memory and the plurality of data processing computing devices.

Method 500 includes receiving 502 computational task data defining a computational task (e.g., a ML and/or AI task and/or a computationally expensive simulation) to be performed. Method 500 further includes retrieving 504 site data corresponding to each of the plurality of data processing computing devices, the site data specifying an expected carbon dioxide emission associated with use of each of the plurality of data processing computing devices.

Method 500 further includes selecting 506, based on the computational task data and the site data, i) a first computational algorithm for executing the computational task, ii) a first data processing computing device of the plurality of data processing computing devices, and iii) at least one time period for executing the first computational algorithm by the first data processing computing device, wherein the first computational algorithm, the first data processing computing device, and the at least one time period are selected to reduce carbon dioxide emissions associated with executing the computational algorithm.

Method 500 further includes instructing 508 the first data processing computing device to execute the first ML algorithm during the at least one time period.

In some embodiments, the computational task is an ML task, and the first computational algorithm is an ML algorithm.

In some embodiments, method 500 further includes to select the first ML algorithm based on an accuracy to unit carbon dioxide emissions ratio.

In some embodiments, method 500 further includes determining a number of iterations for performing the first ML algorithm based on an accuracy to unit carbon dioxide emissions ratio.

In some embodiments, method 500 further includes determining, for each of the plurality of data processing computing devices for each of a plurality of time periods based on the site data, a percentage of power supplied by renewable sources, and selecting the first data processing computing device and the at least one time period based on the percentage determined for each of the plurality of data processing computing devices for each of the plurality of time periods.

In some embodiments, method 500 further includes receiving one or more user-defined constraints for selecting the first data processing computing device and the at least one time period, and selecting the first data processing computing device and the at least one time period further based on the one or more user-defined constraints. In some such embodiments, the one or more user-defined constraints specify that only one data processing computing device be used to execute the first ML algorithm. In some such embodiments, the one or more user-defined constraints specify that the first ML algorithm be executed during a single contiguous time period.

In some embodiments, method 500 further includes receiving second ML task data defining a second ML task to be performed, and generating the schedule further based on the second ML task data.

In some embodiments, method 500 further includes preprocessing input data for the first computational algorithm to reduce a number of quantization bits of the input data and/or a number of dimensions used to learn.

An example technical effect of the methods, systems, and apparatus described herein includes at least one of: (a) reducing carbon dioxide emissions associated with executing a ML task by selecting a ML algorithm, location for performing the ML task, and time period for the ML tack based on an expected contribution or renewable power sources for performing the ML task; and (b) reducing carbon dioxide emissions associated with executing an ML task by selecting an ML algorithm and number of iterations for performing the ML algorithm based on an accuracy of a resulting ML model per unit of expected carbon dioxide emissions associated with executing the ML algorithm.

Example embodiments of a computer system are provided herein. The systems and methods are not limited to the specific embodiments described herein, but rather, components of systems and/or steps of the methods may be utilized independently and separately from other components and/or steps described herein. For example, the methods may also be used in combination with other electronic systems, and are not limited to practice with only the electronic systems, and methods as described herein. Rather, the example embodiments can be implemented and utilized in connection with many other electronic systems.

Some embodiments involve the use of one or more electronic or computing devices (e.g., scheduling computing device 104). Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic controller (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above embodiments are examples only, and thus are not intended to limit in any way the definition and/or meaning of the term processor and processing device.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer system comprising:
a plurality of data processing computing devices, each of said plurality of data processing computing devices configured to execute one or more computational algorithms;
a scheduling computing device comprising a non-transitory memory and a processor in communication with said non-transitory memory and said plurality of data processing computing devices, said processor configured to:
receive computational task data defining a computational task to be performed;
retrieve site data corresponding to each of said plurality of data processing computing devices, the site data specifying an expected carbon dioxide emission associated with use of each of said plurality of data processing computing devices;
select, based on the computational task data and the site data, i) a first computational algorithm for executing the computational task, ii) a first data processing computing device of said plurality of data processing computing devices, and iii) at least one time period for executing the first computational algorithm by said first data processing computing device, wherein the first computational algorithm, said first data processing computing device, and the at least one time period are selected to facilitate reducing carbon dioxide emissions associated with executing the computational algorithm; and
provide instructions to said first data processing computing device, wherein said first data processing computing device executes the first computational algorithm during the at least one time period based on the instructions.

2. The computer system of claim 1, wherein the computational task is a machine learning (ML) task, and wherein the first computational algorithm is an ML algorithm.

3. The computer system of claim 1, wherein said processor is further configured to select the first computational algorithm based on an accuracy to unit carbon dioxide emissions ratio.

4. The computer system of claim 1, wherein said processor is further configured to determine a number of iterations for performing the first computational algorithm based on an accuracy to unit carbon dioxide emissions ratio.

5. The computer system of claim 1, wherein said processor is further configured to:
determine, for each of said plurality of data processing computing devices for each of a plurality of time periods based on the site data, a percentage of power supplied by renewable sources; and
select said first data processing computing device and the at least one time period based on the percentage determined for each of said plurality of data processing computing devices for each of the plurality of time periods.

6. The computer system of claim 1, wherein said processor is further configured to:
receive one or more user-defined constraints for selecting said first data processing computing device and the at least one time period; and
select said first data processing computing device and the at least one time period further based on the one or more user-defined constraints.

7. The computer system of claim 6, wherein the one or more user-defined constraints specify that only one data processing computing device be used to execute the first computational algorithm.

8. The computer system of claim 6, wherein the one or more user-defined constraints specify that the first computational algorithm be executed during a single contiguous time period.

9. The computer system of claim 1, wherein said processor is further configured to:
receive second computational task data defining a second computational task to be performed; and
select said first data processing computing device and the at least one time period further based on the second computational task data.

10. The computer system of claim 1, wherein said processor is further configured to preprocess input data for the first computational algorithm to reduce a number of quantization bits of the input data and/or a number of dimensions used to learn.

11. A method performed by a scheduling computing device including a non-transitory memory and a processor in communication with the non-transitory memory and with a plurality of data processing computing devices, each of the data processing computing devices configured to execute one or more computational algorithms, said method comprising:
receiving, by the scheduling computing device, computational task data defining a computational task to be performed;
retrieving, by the scheduling computing device, site data corresponding to each of the plurality of data processing computing devices, the site data specifying an expected carbon dioxide emission associated with use of each of the plurality of data processing computing devices;
selecting, by the scheduling computing device, based on the computational task data and the site data, i) a first computational algorithm for executing the computational task, ii) a first data processing computing device of the plurality of data processing computing devices, and iii) at least one time period for executing the first computational algorithm by the first data processing computing device, wherein the first computational algorithm, the first data processing computing device, and the at least one time period are selected to facilitate reducing carbon dioxide emissions associated with executing the computational algorithm; and
providing, by the scheduling computing device, instructions to the first data processing computing device, wherein said first data processing computing device executes the first computational algorithm during the at least one time period based on the instructions.

12. The method of claim 11, wherein the computational task is a machine learning (ML) task, and wherein the first computational algorithm is an ML algorithm.

13. The method of claim 11, further comprising selecting, by the scheduling computing device, the first computational algorithm based on an accuracy to unit carbon dioxide emissions ratio.

14. The method of claim 11, further comprising determining, by the scheduling computing device, a number of iterations for performing the first computational algorithm based on an accuracy to unit carbon dioxide emissions ratio.

15. The method of claim 11, further comprising:
determining, by the scheduling computing device, for each of the plurality of data processing computing devices for each of a plurality of time periods based on the site data, a percentage of power supplied by renewable sources; and selecting, by the scheduling computing device, the first data processing computing device and the at least one time period based on the percentage determined for each of the plurality of data processing computing devices for each of the plurality of time periods.

16. The method of claim 11, further comprising:

receiving, by the scheduling computing device, one or more user-defined constraints for selecting the first data processing computing device and the at least one time period; and selecting, by the scheduling computing device the first data processing computing device and the at least one time period further based on the one or more user-defined constraints.

17. The method of claim 16, wherein the one or more user-defined constraints specify that only one data processing computing device be used to execute the first computational algorithm.

18. The method of claim 16, wherein the one or more user-defined constraints specify that the first computational algorithm be executed during a single contiguous time period.

19. A scheduling computing device comprising a non-transitory memory and a processor in communication with said non-transitory memory and a plurality of data processing computing devices, each of the plurality of data processing computing devices configured to execute one or more computational algorithms, said processor configured to:

receive computational task data defining a computational task to be performed;

retrieve site data corresponding to each of the plurality of data processing computing devices, the site data specifying an expected carbon dioxide emission associated with use of each of the plurality of data processing computing devices;

select, based on the computational task data and the site data, i) a first computational algorithm for executing the computational task, ii) a first data processing computing device of the plurality of data processing computing devices, and iii) at least one time period for executing the first computational algorithm by the first data processing computing device, wherein the first computational algorithm, the first data processing computing device, and the at least one time period are selected to facilitate reducing carbon dioxide emissions associated with executing the computational algorithm; and providing instructions to the first data processing computing device, wherein said first data processing computing device executes the first computational algorithm during the at least one time period based on the instructions.

20. The scheduling computing device of claim 19, wherein the computational task is a machine learning (ML) task, and wherein the first computational algorithm is an ML algorithm.

* * * * *